United States Patent
Weise et al.

(10) Patent No.: US 6,299,835 B1
(45) Date of Patent: Oct. 9, 2001

(54) CADMIUM-FREE SILVER ALLOY AS LOW-MELTING BRAZING FILLER MATERIAL

(75) Inventors: Wolfgang Weise, Frankfurt; Willi Malikowski, Aschaffenburg; Dieter Kaufmann, Birstein; Harald Krappitz, Hanau, all of (DE)

(73) Assignee: Degussa AG (DE)

( * ) Notice: Subject to any disclaimer, the term of this patent is extended or adjusted under 35 U.S.C. 154(b) by 0 days.

(21) Appl. No.: 08/273,742

(22) Filed: Jul. 12, 1994

(30) Foreign Application Priority Data

Jul. 12, 1993 (DE) ................................. 43 23 227

(51) Int. Cl.$^7$ .................................. B23K 35/30
(52) U.S. Cl. ...................... 420/504; 420/587; 228/262.9; 428/673
(58) Field of Search .................... 420/504, 587; 428/673; 228/262.9

(56) References Cited

U.S. PATENT DOCUMENTS

| | | | |
|---|---|---|---|
| 5,341,981 | * | 8/1994 | Weise et al. ................. 420/502 |
| 5,352,542 | | 10/1994 | Voelker et al. . |
| 5,400,946 | | 3/1995 | Weise et al. . |

FOREIGN PATENT DOCUMENTS

| | | |
|---|---|---|
| AS 2417060 | 10/1974 | (DE) . |
| OS 2745409 | 4/1979 | (DE) . |
| OS 3315498 | 11/1984 | (DE) . |
| 4209291 | 9/1993 | (DE) . |
| 2275271 * | 1/1976 | (FR) . |
| 51 128 664 | 11/1976 | (JP) . |
| 4339590 * | 11/1992 | (JP) . |

OTHER PUBLICATIONS

DIN 50121, pp. 98, 99, 104 and 105, dated Jan. 1978.

* cited by examiner

Primary Examiner—Melvyn Andrews
(74) Attorney, Agent, or Firm—Smith, Gambrell & Russell

(57) ABSTRACT

Cadmium-free hard solders having working temperatures of less than 630° C., which are easily workable and yield ductile soldered joints, are composed of 30 to 60% by weight of silver, 10 to 36% by weight of copper, 15 to 32% by weight of zinc, 0.5 to 7% by weight of gallium, 0.5 to 7% by weight of tin and 0 to 5% by weight of indium.

18 Claims, No Drawings

CADMIUM-FREE SILVER ALLOY AS LOW-MELTING BRAZING FILLER MATERIAL

FIELD OF THE INVENTION

The invention relates to low melting brazing filler metal formed of a cadmium-free silver alloy with a working temperature of less than 630° C. and its use, particularly, as a universal filler material for brazing with fluxing agents in the air.

BACKGROUND DISCUSSION

Brazing filler metals are metal alloys suitable for soldering and having working temperatures of greater than 450° C. They are frequently composed of silver with added copper, zinc and cadmium.

Applicants are not aware of any universal brazing filler metal that are, in practice, suitable for use with fluxing agents or under vacuum or inert gas whereof the working temperature is under 600° C. But the lower the working temperature, the lesser is the extent to which the mechanical properties of the workpiece to be brazed are impaired during the brazing process by heating to the brazing temperature. Apart from the influence on the strength, particularly of quenched and drawn steel, the thermal stresses also remain less when the working temperature of the brazing filler metal is kept low. At the same time, the energy requirement for the brazing process is reduced. It is therefore important to have available brazing filler metals with working temperatures that are as low as possible.

Brazing filler metals having working temperatures of between 600 and 700° C. are composed predominantly of alloys of the metals silver, copper, tin, zinc and cadmium. But it is known that cadmium and its volatile oxides have a toxic effect when they are taken up into the human body. This incorporation cannot always be completely eliminated when brazing is performed incorrectly with cadmium-containing brazing alloys, so that there is the danger that symptoms of poisoning may appear. This gives rise to the requirement to greatly reduce the cadmium content in brazing alloys or, where it is technically feasible, wholly to avoid it. This is moreover highly desirable on general ecological grounds.

In the majority of the brazing filler metals used hitherto, which have working temperatures of between 600 and 700° C., a more or less high cadmium content is necessary in order to attain these low temperatures. The lowest-melting cadmium-containing solder used hitherto has the composition Ag 44, Cu 19, Zn 21, Cd 20 and a working temperature of 610° C. It results moreover in the brazed joint produced having outstanding mechanical properties. The brazed joint has high tensile strength and is very ductile. The ductility is frequently expressed by so-called bending angles which are measured on edgeless brazed joints. Measurement of the bending angle relies on the measurement of welded samples according to DIN 50 121. Two steel rods with dimensions of 4×4×40 mm are butt-welded together. The sample is then bent until a tear occurs in the brazed area. The measured angle is called the bending angle.

Cadmium-free brazed alloys have been in existence for a long time and are being used with increasing frequency. The cadmium-free hard solders known to date are conventionally composed of silver, copper, zinc and tin. The working temperatures of these solders are however from 80 to 120° C. above those of the corresponding cadmium-containing solders, which is unacceptable in temperature-sensitive workpieces, so that even today cadmium-containing solders are still necessary in many cases. It is believed that the lowest-melting cadmium-free hard solder has the composition Ag 56, Cu 22, Zn 17, Sn 5 and a working temperature of 650° C. Brazed joints with this filler metal do indeed show relatively high strength and ductility, nevertheless the ductile properties in particular, that is, the bending angles, of soldered joints with cadmium-containing hard solders are not achieved. There certainly also exist brazing filler metals which achieve the ductility of soldered joints produced by cadmium-containing solders, but these solders have an even higher working temperature in excess of 700° C.

From DE-AS 24 17 060 a cadmium-free hard solder alloy based on silver is known which contains from 40 to 50% by weight of silver, 15 to 38% by weight of copper, 22 to 32% by weight of zinc, 1 to 6% by weight of tin and 0.5 to 3% by weight of indium. The working temperatures of these brazing filler metals are between 710 and 630° C., which is still too high for many applications. Furthermore, these alloys do not achieve the ductility required for many soldered joints.

Stratified contact-pieces for weak current contacts wherein the layer of solder is composed of a silver-copper-gallium alloy are described in DE-OS 33 15 498. They contain 60 to 75% by weight of silver, 18 to 35% by weight of copper and 5 to 8% by weight of gallium, with the latter component also being replaceable by 4 to 7% by weight of gallium plus 1 to 4% by weight of indium, or by 1 to 4% by weight of gallium and 3 to 7% by weight of tin. Melting points for these brazing alloys are not given. They are however above 650° C.

Brazing alloys having 50 to 65% by weight of silver, 5 to 41% by weight of copper, 3 to 12% by weight of gallium and 6 to 18% by weight of indium are known from SU-PS 450 673 (Derwent Abstract 75-65066W7/39). Their melting points are between 640 and 680° C. The alloys are moreover very brittle.

Brazing filler metals alloys containing 50 to 70% by weight of silver, 15 to 30% by weight of copper, 8 to 20% by weight of zinc and 0.1 to 8% by weight of gallium and/or indium are described in DE-OS 27 45 409. Their melting points are between 650 and 680° C. and thus to some extent distinctly above those of cadmium-containing alloys.

SUMMARY OF THE INVENTION

Based on initial internal testing by the Applicants, the melting points of alloys could be reduced still further by increasing the gallium content. However, silver-copper alloys having zinc, tin and/or indium and which contained more than 8% by weight of gallium had shown in these tests to be not easily workable and hence not well adapted for processing into semi-finished products and thus also not able to fulfil the requirements for a ductile brazed joint.

The present invention is the result of further testing in an effort to develop a cadmium-free brazing alloy based on silver which has as low as possible a working temperature, of less than 630° C., is easily workable, results in ductile soldered joints having ductilities comparable to those of the cadmium-containing solders and can be universally applied.

The invention is also directed at a method of utilizing the novel cadmium-free brazing filler metal in a brazing process.

The above noted objects were satisfied upon the development of the present invention which features a cadmium-free brazing alloy having 30 to 80% by weight of silver, 10 to 36% by weight of copper, 15 to 32% by weight of zinc, 0.5 to 7% by weight of gallium, 0.5 to 7% by weight of tin and 0 to 5% by weight of indium.

Alloys are preferably used having 50 to 60% by weight of silver, 15 to 25% by weight of copper, 15 to 25% by weight of zinc, 0.5 to 5% by weight of gallium, 0.5 to 5% by weight of tin and 0 to 5% by weight of indium, wherein the content of gallium and tin together must amount to at least 2% by weight.

Alloys having 52 to 58% by weight of silver, 15 to 22% by weight of copper, 16 to 23% by weight of zinc, 0.5 to 4% by weight of gallium, 0.5 to 5% by weight of tin and 0 to 5% by weight of indium, wherein the content of gallium and tin together must amount to more than 5% by weight, particularly more than 7% by weight, have proved to be successful.

An alloy having 56% by weight of silver, 19% by weight of copper, 17% by weight of zinc, 5% by weight of tin and 3% by weight of gallium has proved to be particularly successful.

These alloys have working temperatures of less than 630° C. and surprisingly the brazed joints thereof have bending angles which are equal to or even better than those of joints soldered with cadmium-containing alloys. It has become apparent that, through the addition by alloying of gallium to silver-copper-zinc-tin alloys in accordance with the percentages set forth above, the liquidus temperature can again be sharply reduced without impairing the ductility, although in earlier testing the addition of gallium in the amounts noted above had caused brittleness in the resultant alloys. The gallium-containing five-component alloys of Ag, Cu, Zn, Sn surprisingly yield bending angles that are higher or of at least equal magnitude to those of the AgCuZnSn alloys—used hitherto, which without gallium have distinctly higher working temperatures. Thus a brazing alloy has been made which has the properties of the cadmium-containing brazing alloys used in practice but wherein any toxic additives are dispensed with.

Some brazing filler metals according to the invention are shown in the table below together with their working temperatures and the bending angle measured on brass workpieces.

TABLE

|   | Ag | Cu | Zn | Sn | Ga | In | $T_A$ | Bending angle |
|---|----|----|----|----|----|----|-------|---------------|
| 1 | 56 | 19 | 17 | 5  | 3  | 0  | 610° C. | 60° |
| 2 | 56 | 19 | 17 | 6  | 2  | 0  | 605° C. | 60° |
| 3 | 55 | 15 | 22 | 2  | 6  | 0  | 610° C. | 55° |
| 4 | 63 | 15 | 15 | 2  | 5  | 0  | 615 C.  | 58° |
| 5 | 63 | 15 | 15 | 5  | 2  | 0  | 620 C.  | 52° |
| 6 | 60 | 15 | 17 | 1  | 5  | 2  | 610° C. | 56° |

Preferred embodiments of the invention provide bending angles which are from 52 to 600. Also, the percentages by weight provided above preferably total 100% when summed (apart from customary impurities, which amounts to a total less than 1%). The solders of the present invention can be formed in accordance with conventional processes (e.g., melting, pouring, forming into wire or profiles, usually by means of extrusion).

German priority application No. P 43 23 227.2 is incorporated herein by reference

What is claimed is:

1. A brazing filler metal having a working temperature of less than 630° C. and being comprised of a cadmium-free silver alloy having 30 to 80% by weight of silver, 10 to 36% by weight of copper, 15 to 32% by weight of zinc, 0.5 to 7% by weight of gallium, 0.5 to 7% by weight of tin and 0 to 5% by weight of indium.

2. A brazing filler metal as recited in claim 1 wherein said cadmium-free silver alloy has 50 to 60% by weight of silver, 15 to 25% by weight of copper, 15 to 25% by weight of zinc, 0.5 to 5% by weight of gallium, 0.5 to 5% by weight of tin and 0 to 5% by weight of indium, and wherein the content of gallium and tin together amounts to at least 2% by weight.

3. A brazing filler metal as recited in claim 1 wherein said cadmium-free silver alloy has 52 to 58% by weight of silver, 15 to 22% by weight of copper, 16 to 23% by weight of zinc, 0.5 to 4% by weight of gallium, 0.5 to 5% by weight of tin and 0 to 5% by weight of indium, and wherein the content of gallium and tin together amounts to at least 5% by weight.

4. A brazing filler metal as recited in claim 3 wherein said cadmium-free silver alloy has a content of gallium and tin which together amounts to at least 7% by weight.

5. A brazing filler metal as recited in claim 1 wherein said cadmium-free silver alloy has 56% by weight of silver, 19% by weight of copper, 17% by weight of zinc, 5% by weight of tin and 3% by weight of gallium.

6. A method of brazing comprising utilizing a brazing filler metal defined by claim 1.

7. A method as recited in claim 6 wherein the brazing filler metal includes a cadmium-free silver alloy having 50 to 60% by weight of silver, 15 to 25% by weight of copper, 15 to 25% by weight of zinc, 0.5 to 5% by weight of gallium, 0.5 to 5% by weight of tin and 0 to 5% by weight of indium and, wherein the content of gallium and tin together amounts to at least 2% by weight.

8. A method as recited in claim 6 wherein the brazing filler metal includes a cadmium-free silver alloy having 52 to 58% by weight of silver, 15 to 22% by weight of copper, 16 to 23% by weight of zinc, 0.5 to 4% by weight of gallium, 0.5 to 5% by weight of tin and 0 to 5% by weight of indium and, wherein the content of gallium and tin together amounts to at least 5% by weight.

9. A method as recited in claim 8 wherein the brazing filler metal includes a cadmium-free silver alloy that has a content of gallium and tin which together amounts to at least 7% by weight.

10. A method as recited in claim 6 wherein said brazing filler metal includes a cadmium-free silver alloy having 56% by weight of silver, 19% by weight of copper, 17% by weight of zinc, 5% by weight of tin and 3% by weight of gallium.

11. An article having a first component and a second component with said first and second components being bonded together by a solder material defined according to claim 1.

12. An article as recited in claim 11 wherein brazing filler metal bonding said first and second components includes a cadmium-free silver alloy having 50 to 60% by weight of silver, 15 to 25% by weight of copper, 15 to 25% by weight of zinc, 0.5 to 5% by weight of gallium, 0.5 to 5% by weight of tin and 0 to 5% by weight of indium and, wherein the content of gallium and tin together amounts to at least 2% by weight.

13. An article as recited in claim 12 wherein said first and second components are bonded together by a brazing filler metal having a cadmium-free silver alloy having 52–58% by weight of silver, 15 to 22% by weight of copper, 16 to 23% by weight of zinc, 0.5 to 4% by weight of gallium, 0.5 to 5% by weight of tin and 0 to 5% by weight of indium and, wherein the content of gallium and tin together amounts to at least 5% by weight.

14. An article as recited in claim 13 brazing filler metal and second components are bonded together by a solder material having a cadmium-free silver alloy with a content of gallium and tin which together amounts to at least 7% by weight.

15. An article as recited in claim 12 wherein said first and second components are bonded together by a brazing filler metal having a cadmium-free silver alloy with 56% by weight of silver, 19% by weight of copper, 17% by weight of zinc, 5% by weight of gallium, 3% by weight of gallium.

16. A brazing filler metal as recited in claim 1 wherein silver in said alloy represents the highest percentage by weight component in said alloy.

17. A brazing filler metal as recited in claim 1 wherein the percentages by weight of the silver, copper, zinc, gallium, tin and indium total 100% when summed and when disregarding customary impurities.

18. A brazing filler metal which includes an alloy which consists essentially of:

(a) 30 to 80% by weight of silver, (b) 10 to 36% by weight of copper, (c) 15 to 32% by weight of zinc, (d) 0.5 to 7% by weight of gallium (e) 0.5 to 7% by weight of tin, and (f) 0 to 5% by weight of indium, such that said brazing filler metal is cadmium free, and said brazing filler metal has a working temperature of less than 630° C.

\* \* \* \* \*